(12) United States Patent
Zhang et al.

(10) Patent No.: US 12,177,561 B2
(45) Date of Patent: *Dec. 24, 2024

(54) WEARABLE SATELLITE RECEIVER WITH REDUCED POWER CONSUMPTION

(71) Applicant: Snap Inc., Santa Monica, CA (US)

(72) Inventors: Zhibin Zhang, Venice, CA (US); Russell Douglas Patton, Playa Vista, CA (US); Peter Brook, Marina del Rey, CA (US); Dunxu Hu, Venice, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/453,591

(22) Filed: Aug. 22, 2023

(65) Prior Publication Data

US 2023/0396877 A1 Dec. 7, 2023

Related U.S. Application Data

(63) Continuation of application No. 17/817,725, filed on Aug. 5, 2022, now Pat. No. 11,785,336, which is a
(Continued)

(51) Int. Cl.
*H04N 5/335* (2011.01)
*G06F 1/16* (2006.01)
(Continued)

(52) U.S. Cl.
CPC .......... *H04N 23/651* (2023.01); *G06F 1/163* (2013.01); *G06F 1/3287* (2013.01); *H04N 5/76* (2013.01);
(Continued)

(58) Field of Classification Search
CPC ........ H04N 23/651; H04N 5/76; H04N 23/60; H04N 5/77; H04N 9/8205; G06F 1/163;
(Continued)

(56) References Cited

U.S. PATENT DOCUMENTS 6,995,792 B1  2/2006  Ogura
7,797,135 B2  9/2010  Fitzhugh
(Continued)

OTHER PUBLICATIONS

"U.S. Appl. No. 16/143,008, Advisory Action mailed Apr. 14, 2020", 3 pgs.
(Continued)

*Primary Examiner* — Gary C Vieaux
(74) *Attorney, Agent, or Firm* — Schwegman Lundberg & Woessner, P.A.

(57) ABSTRACT

Systems and methods for determining a location of a wearable electronic device are disclosed. In some aspects, the device includes a position acquisition device and an accelerometer. A hardware processor included in the device may be configured to generally maintain the position acquisition device in a low power state to save power. When a video or image is captured, it may tag the video or image with first location information. Given the inoperative position acquisition device, a current location may not be known. In some aspects, in response to a need for location information, measurements from an accelerometer may be stored. The position acquisition device may also be transitioned to an operative state, and after some time delay, a second location determined. In some aspects, the location of the capture may then be obtained based on the acceleration measurements and the second location.

20 Claims, 10 Drawing Sheets

Related U.S. Application Data continuation of application No. 17/125,176, filed on Dec. 17, 2020, now Pat. No. 11,445,112, which is a continuation of application No. 16/143,008, filed on Sep. 26, 2018, now Pat. No. 10,893,198.

(60) Provisional application No. 62/587,205, filed on Nov. 16, 2017.

(51) Int. Cl.

| | | |
|---|---|---|
| *G06F 1/3287* | (2019.01) | |
| *H04N 5/76* | (2006.01) | |
| *H04N 23/60* | (2023.01) | |
| *H04N 23/65* | (2023.01) | |
| *H04W 4/02* | (2018.01) | |
| *H04W 52/02* | (2009.01) | |
| *H04W 4/029* | (2018.01) | |

(52) U.S. Cl.
CPC ............ *H04N 23/60* (2023.01); *H04W 4/027* (2013.01); *H04W 52/0254* (2013.01); *H04W 4/029* (2018.02)

(58) Field of Classification Search
CPC .... G06F 1/3287; G06F 1/3206; G06F 1/3234; H04W 4/027; H04W 52/0254; H04W 4/029; H04W 4/38
See application file for complete search history.

(56) References Cited

U.S. PATENT DOCUMENTS

| | | | |
|---|---|---|---|
| 10,893,198 | B1 | 1/2021 | Zhang et al. |
| 11,445,112 | B2 | 9/2022 | Zhang et al. |
| 11,785,336 | B2 | 10/2023 | Zhang et al. |
| 2008/0225128 | A1 | 9/2008 | Uchiyama et al. |
| 2009/0251558 | A1 | 10/2009 | Park |
| 2009/0278557 | A1 | 11/2009 | Taguchi |
| 2010/0045518 | A1* | 2/2010 | Lee ................... H04N 1/00307 342/357.43 |
| 2012/0287296 | A1 | 11/2012 | Fukui |
| 2014/0204235 | A1 | 7/2014 | Wexler et al. |
| 2016/0156848 | A1 | 6/2016 | Jen |
| 2016/0269868 | A1 | 9/2016 | Su et al. |
| 2017/0308738 | A1 | 10/2017 | Zhang et al. |
| 2019/0182415 | A1 | 6/2019 | Sivan |
| 2021/0105415 | A1 | 4/2021 | Zhang et al. |
| 2022/0377247 | A1 | 11/2022 | Zhang et al. |

OTHER PUBLICATIONS

"U.S. Appl. No. 16/143,008, Final Office Action mailed Feb. 19, 2020", 16 pgs.
"U.S. Appl. No. 16/143,008, Non Final Office Action mailed May 7, 2020", 14 pgs.
"U.S. Appl. No. 16/143,008, Non Final Office Action mailed Sep. 9, 2019", 15 pgs.
"U.S. Appl. No. 16/143,008, Notice of Allowance mailed Sep. 10, 2020", 9 pgs.
"U.S. Appl. No. 16/143,008, Response filed Apr. 6, 2020 to Final Office Action mailed Feb. 19, 2020", 9 pgs.
"U.S. Appl. No. 16/143,008, Response filed Jul. 13, 2020 to Non Final Office Action mailed May 7, 2020", 9 pgs.
"U.S. Appl. No. 16/143,008, Response filed Dec. 6, 2019 to Non Final Office Action mailed Sep. 9, 2019", 10 pgs.
"U.S. Appl. No. 17/125,176, Non Final Office Action mailed Jan. 19, 2022", 22 pgs.
"U.S. Appl. No. 17/125,176, Notice of Allowance mailed May 5, 2022", 8 pgs.
"U.S. Appl. No. 17/125,176, Response filed Apr. 18, 2022 to Non Final Office Action mailed Jan. 19, 2022", 9 pgs.
"U.S. Appl. No. 17/817,725, Non Final Office Action mailed Dec. 5, 2022", 28 pgs.
"U.S. Appl. No. 17/817,725, Notice of Allowance mailed May 24, 2023", 8 pgs.
"U.S. Appl. No. 17/817,725, Response filed Feb. 20, 2023 to Non Final Office Action mailed Dec. 5, 2022", 8 pgs.
"U.S. Appl. No. 17/817,725, 312 Amendment filed Aug. 22, 2023", 6 pgs.
"U.S. Appl. No. 17/817,725, PTO Response to Rule 312 Communication mailed Aug. 29, 2023", 2 pgs.

\* cited by examiner

WEARABLE SATELLITE RECEIVER WITH REDUCED POWER CONSUMPTION

CROSS REFERENCE TO RELATED APPLICATIONS

This application is a continuation of U.S. patent application Ser. No. 17/817,725, filed Aug. 5, 2022, which is a continuation of U.S. patent application Ser. No. 17/125,176, filed Dec. 17, 2020, now issued as U.S. Pat. No. 11,445,112, which is a continuation of U.S. patent application Ser. No. 16/143,008, filed Sep. 26, 2018, now issued as U.S. Pat. No. 10,893,198, which claims the benefit of priority to U.S. Provisional Application Ser. No. 62/587,205, filed Nov. 16, 2017. The contents of these prior applications are considered part of this application, and are hereby incorporated by reference in their entireties.

BACKGROUND

Wearable devices have several design constraints. One of these constraints is weight, and another is size. To reduce size and weight, a wearable device may make use of a relatively small battery. As a result, power consumption of the wearable device can be an important factor in user satisfaction. Therefore, reducing power consumption in wearable devices continues to be an important design consideration.

BRIEF DESCRIPTION OF THE DRAWINGS

Various ones of the appended drawings merely illustrate example embodiments of the present disclosure and should not be considered as limiting its scope.

DETAILED DESCRIPTION

Figure 1:
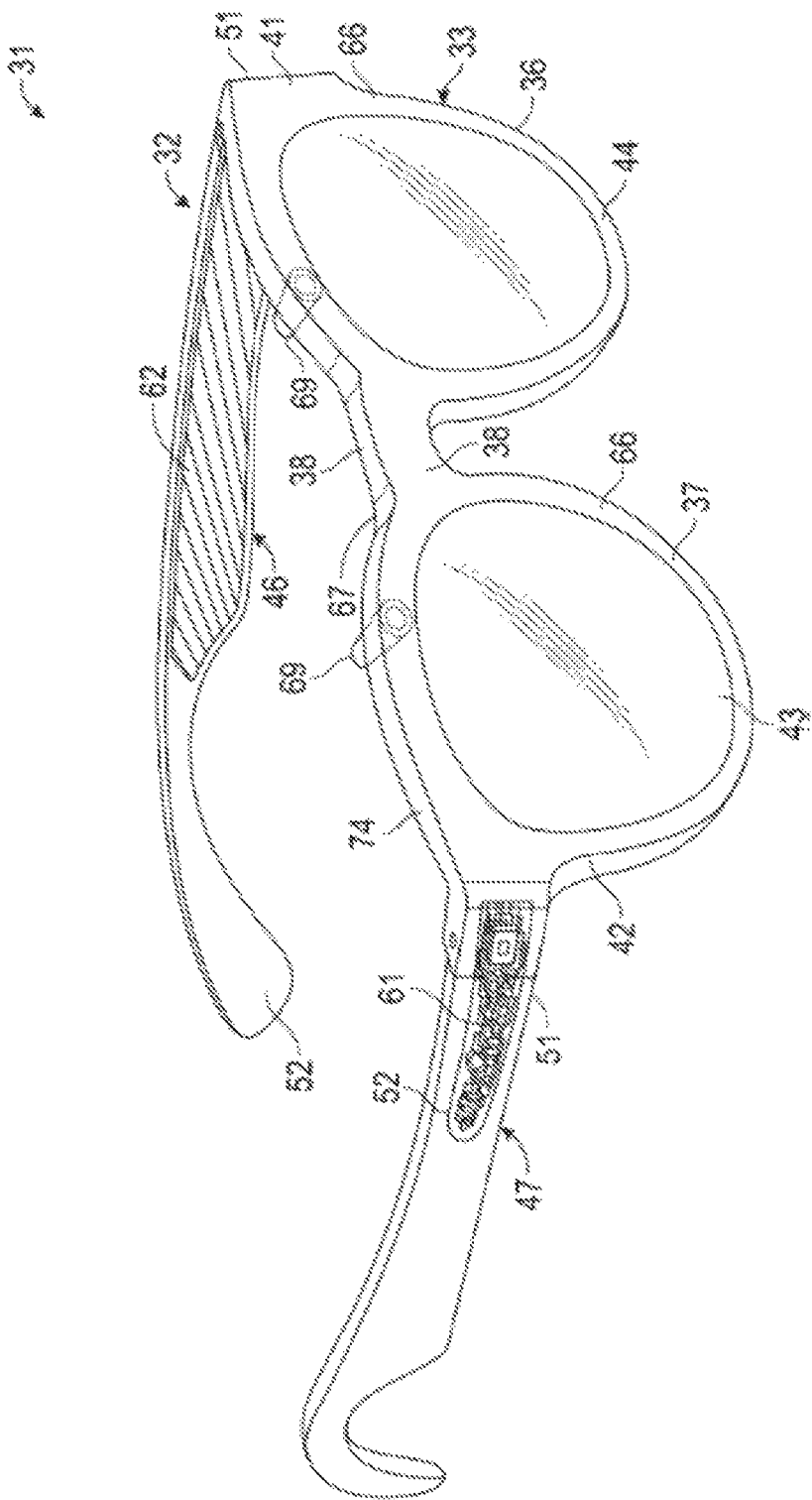
FIG. 1 is a front perspective view of one embodiment of a camera device, according to some example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Disclosed are methods, devices, systems, and computer readable storage media for providing location information in a wearable device with reduced power consumption. Mobile devices may capture photos or videos. In some aspects, the mobile devices will tag the photos or videos with location information, indicating a location where the photo or video was captured. To obtain the location information, the device may be equipped with a satellite receiver. To obtain location information, a satellite receiver consumes power. In some cases, a satellite receiver may need to receive and process signals from at least three separate satellites before it may determine a location of the mobile device. Since traditional devices are not able to anticipate when a photo or video may be captured, and thus when location information may be needed, these devices may continually operate their satellite receiver, so that location information is always available. Upon capturing the video or photo, the video or photo may then be tagged with the location information. While this provides a reliable mechanism to accurately tag photos or videos with location information when captured, it does so at the expense of battery power. In wearable devices, battery capacity may be relatively small to reduce size and/or weight and/or cost of the wearable device. Thus, this continuous use of a satellite receiver to provide infrequently needed location information may not provide the user with the best tradeoff between location services and other utility available from their mobile device, especially if the battery power of their mobile device is frequently depleted due to operation of the satellite receiver.

To reduce battery consumption of a satellite receiver, the disclosed methods and systems generally configure the satellite receiver to be in a low power state, such as an off state. In this state, the satellite receiver is unable to provide location information. Because the satellite receiver is generally in an off state however, there may be a delay before location information may be obtained. For example, after the satellite receiver is transitioned to an "on" state, it may require at least several seconds for the satellite receiver to determine a location of the wearable or mobile device. During this time, the position of the mobile device may change. To track changes in location from the time location information is needed (for example, when a photo or video is captured) until a satellite receiver can determine a location after being transitioned from a low power state, the disclosed methods and devices may maintain a record of data collected from an accelerometer. For example, the accelerometer may record accelerations in at least three axis (X, Y, and Z) at least between the time the location information is needed and the satellite receiver is able to provide location information. Using this recorded acceleration data, once the location is available from the satellite receiver, a previous location may be determined based on the location provided by the satellite receiver and the stored accelerometer measurements. By calculating a location for the mobile device at a time in the past, the satellite receiver may acquire a fix and provide location information only when the location information is needed. Thus, it is not necessary in the disclosed embodiments to continuously operate a satellite receiver such that location information is ready on demand. As such, needless acquisition of location information by the satellite receiver is reduced, significantly reducing an amount of power consumed by the satellite receiver.

FIG. 1 shows aspects of certain embodiments illustrated by a front perspective view of glasses 31. The glasses 31 can include a frame 32 made from any suitable material such as plastic or metal, including any suitable shape memory alloy. The frame 32 can have a front piece 33 that can include a first or left lens, display or optical element holder 36 and a second or right lens, display or optical element holder 37 connected by a bridge 38. The front piece 33 additionally includes a left end portion 41 and a right end portion 42. A first or left optical element 43 and a second or right optical element 44 can be provided within respective left and right optical element holders 36, 37. Each of the optical elements 43, 44 can be a lens, a display, a display assembly or a combination of the foregoing. Any of the display assemblies disclosed herein can be provided in the glasses 31.

Frame 32 additionally includes a left arm or temple piece 46 and a second arm or temple piece 47 coupled to the respective left and right end portions 41, 42 of the front piece 33 by any suitable means such as a hinge (not shown), so as to be coupled to the front piece 33, or rigidly or fixably secured to the front piece so as to be integral with the front piece 33. Each of the temple pieces 46 and 47 can include a first portion 51 that is coupled to the respective end portion 41 or 42 of the front piece 33 and any suitable second portion 52 for coupling to the ear of the user. In one embodiment the front piece 33 can be formed from a single piece of material, so as to have a unitary or integral construction. In one embodiment, such as illustrated in FIG. 1, the entire frame 32 can be formed from a single piece of material so as to have a unitary or integral construction.

Glasses 31 can include a computing device, such as computer 61, which can be of any suitable type so as to be carried by the frame 32 and, in one embodiment of a suitable size and shape, so as to be at least partially disposed in one of the temple pieces 46 and 47. In one embodiment, as illustrated in FIG. 1, the computer 61 is sized and shaped similar to the size and shape of one of the temple pieces 46, 47 and is thus disposed almost entirely if not entirely within the structure and confines of such temple pieces 46 and 47. In one embodiment, the computer 61 can be disposed in both of the temple pieces 46, 47. The computer 61 can include one or more processors with memory, wireless communication circuitry, and a power source. As described above, the computer 61 comprises low-power circuitry, high-speed circuitry, and a display processor. Various other embodiments may include these elements in different configurations or integrated together in different ways. Additional details of aspects of computer 61 may be implemented as illustrated by device 210 discussed below.

The computer 61 additionally includes a battery 62 or other suitable portable power supply. In one embodiment, the battery 62 is disposed in one of the temple pieces 46 or 47. In the glasses 31 shown in FIG. 1 the battery 62 is shown as being disposed in left temple piece 46 and electrically coupled using connection 74 to the remainder of the computer 61 disposed in the right temple piece 47. The one or more input and output devices can include a connector or port (not shown) suitable for charging a battery 62 accessible from the outside of frame 32, a wireless receiver, transmitter or transceiver (not shown) or a combination of such devices. In various embodiments, the computer 61 and the battery 62 may consume power as part of glasses operations for capturing images, transmitting data, or performing other computing processes. Such power consumption may result in heat that may impact the device as well as a user wearing the device. Embodiments described herein may function to manage temperature in wearable devices such as glasses 31.

Glasses 31 include cameras 69. Although two cameras are depicted, other embodiments contemplate the use of a single or additional (i.e., more than two) cameras. In various embodiments, glasses 31 may include any number of input sensors or peripheral devices in addition to cameras 69. Front piece 33 is provided with an outward facing, forward-facing or front or outer surface 66 that faces forward or away from the user when the glasses 31 are mounted on the face of the user, and an opposite inward-facing, rearward-facing or rear or inner surface 67 that faces the face of the user when the glasses 31 are mounted on the face of the user. Such sensors can include inwardly-facing video sensors or digital imaging modules such as cameras that can be mounted on or provided within the inner surface 67 of the front piece 33 or elsewhere on the frame 32 so as to be facing the user, and outwardly-facing video sensors or digital imaging modules such as cameras 69 that can be mounted on or provided with the outer surface 66 of the front piece 33 or elsewhere on the frame 32 so as to be facing away from the user. Such sensors, peripheral devices or peripherals can additionally include biometric sensors, location sensors, or any other such sensors.

Embodiments of this disclosure may provide for reduced power consumption of the computer 61. For example, in some aspects, the computer 61 may include a satellite receiver. The satellite receiver may consume power when acquiring signals from satellites and determining location information for the glasses 31. While the location information provided by the satellite receiver may be useful to tag videos or images captured by the cameras 69, continuously powering the satellite receiver in an operative state may be disadvantageous for battery life of the glasses 31. Therefore, the embodiments of this disclosure provide for maintaining the satellite receiver in a lower power state to conserve battery power, while still providing location services to tag videos and or snapshot images captured by the cameras 69.

Figure 2:
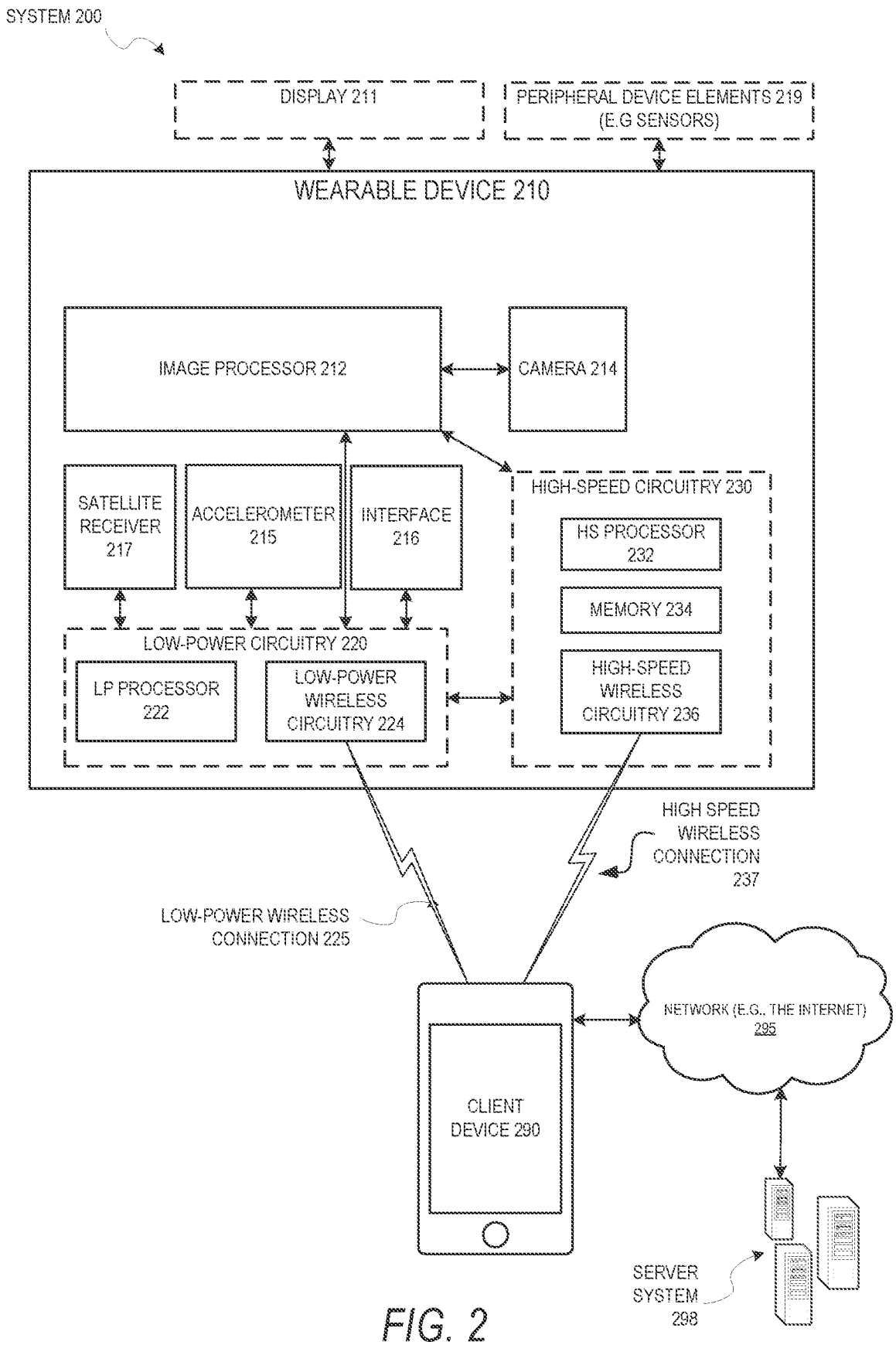
FIG. 2 is a block diagram illustrating a networked system including details of a camera device, according to some example embodiments.

FIG. 2 is a block diagram illustrating a networked system 200 including details of a device 210, according to some example embodiments. In certain embodiments, device 210 may be implemented in glasses 31 of FIG. 1 described above. For example, device 210 may be equivalent, in some aspects, to the computer 61.

System 200 includes device 210, client device 290, and server system 298. Client device 290 may be a smartphone, tablet, phablet, laptop computer, access point, or any other such device capable of connecting with device 210 using both a low-power wireless connection 225 and a high-speed wireless connection 237. Client device 290 is connected to server system 298 and network 295. The network 295 may include any combination of wired and wireless connections. Server system 298 may be one or more computing devices as part of a service or network computing system. Client device 290 and any elements of server system 298 and network 295 may be implemented using details of software architecture 902 or machine 1000 described in FIGS. 9 and 10.

System 200 may optionally include additional peripheral device elements 219 and/or a display 211 integrated with device 210. Such peripheral device elements 219 may include biometric sensors, additional sensors, or display elements integrated with device 210. Examples of peripheral device elements 219 are discussed further with respect to FIGS. 9 and 10. For example, peripheral device elements 219 may include any I/O components 1050 including output components, 1052 motion components 1058, or any other such elements described herein. Example embodiments of a display 211 are discussed in FIGS. 3 and 4.

Device 210 includes an accelerometer 215, camera 214, video processor 212, interface 216, satellite receiver 217 or more generally a position acquisition device, which may use non-satellite means to acquire a position, low-power circuitry 220, and high-speed circuitry 230. Camera 214 includes digital camera elements such as a charge coupled device, a lens, or any other light capturing elements that may be used to capture data as part of camera 214. In some aspects, the camera 214 may be the camera 69, discussed above with respect to FIG. 1. While the accelerometer 215 is shown in FIG. 2 as being included within the device 210, in some aspects, the accelerometer 215 may be a separate device, and be operably connected, for example, via a communications bus or other interconnect technology, to the device 210. Similarly, while the satellite receiver is shown in FIG. 2 as integrated within the device 210, in some aspects, it may be a separate device, and be operably connected, for example, via a communications bus or other interconnect technology, to the device 210.

Interface 216 refers to any source of a user command that is provided to device 210. In one implementation, interface 216 is a physical button on a camera that, when depressed, sends a user input signal from interface 216 to low power processor 222. A depression of such a camera button followed by an immediate release may be processed by low power processor 222 as a request to capture a single image. A depression of such a camera button for a first period of time may be processed by low-power processor 222 as a request to capture video data while the button is depressed, and to cease video capture when the button is released, with the video captured while the button was depressed stored as a single video file. In certain embodiments, the low-power processor 222 may have a threshold time period between the press of a button and a release, such as 500 milliseconds or one second, below which the button press and release is processed as an image request, and above which the button press and release is interpreted as a video request. The low power processor 222 may make this determination while the video processor 212 is booting. In other embodiments, the interface 216 may be any mechanical switch or physical interface capable of accepting user inputs associated with a request for data from the camera 214. In other embodiments, the interface 216 may have a software component, or may be associated with a command received wirelessly from another source.

Satellite receiver 217 may implement a low power state and a higher power state. In the low power state, the satellite receiver may be completely off, and consume no power, or may be in a stand by state, and consume some first amount of power. In the low power state, the satellite receiver 217 may be unable to determine a location of the device 210. In the higher power state, the satellite receiver 217 may be operable to determine location information. For example, in some aspects, the satellite receiver 217 may be a global positioning system receiver. In some aspects, the satellite receiver 217 may receive signals from three or more satellites in order to triangulate the signals and determine a present location on the earth's surface.

Video processor 212 includes circuitry to receive signals from the camera 214 and process those signals from the camera 214 into a format suitable for storage in the memory 234. Video processor 212 is structured within device 210 such that it may be powered on and booted under the control of low-power circuitry 220. Video processor 212 may additionally be powered down by low-power circuitry 220. Depending on various power design elements associated with video processor 212, video processor 212 may still consume a small amount of power even when it is in an off state. This power will, however, be negligible compared to the power used by video processor 212 when it is in an on state, and will also have a negligible impact on battery life. As described herein, device elements in an "off" state are still configured within a device such that low-power processor 222 is able to power on and power down the devices. A device that is referred to as "off" or "powered down" during operation of device 210 does not necessarily consume zero power due to leakage or other aspects of a system design.

In one example embodiment, video processor 212 comprises a microprocessor integrated circuit (IC) customized for processing sensor data from camera 214, along with volatile memory used by the microprocessor to operate. In order to reduce the amount of time that video processor 212 takes when powering on to processing data, a non-volatile read only memory (ROM) may be integrated on the IC with instructions for operating or booting the video processor 212. This ROM may be minimized to match a minimum size needed to provide basic functionality for gathering sensor data from camera 214, such that no extra functionality that would cause delays in boot time are present. The ROM may be configured with direct memory access (DMA) to the volatile memory of the microprocessor of video processor 212. DMA allows memory-to-memory transfer of data from the ROM to system memory of the video processor 212 independently of operation of a main controller of video processor 212. Providing DMA to this boot ROM further reduces the amount of time from power on of the video processor 212 until sensor data from the camera 214 can be processed and stored. In certain embodiments, minimal processing of the camera signal from the camera 214 is performed by the video processor 212, and additional processing may be performed by applications operating on the client device 290 or server system 298.

Low-power circuitry 220 includes low-power processor 222 and low-power wireless circuitry 224. These elements of low-power circuitry 220 may be implemented as separate elements or may be implemented on a single IC as part of a system on a single chip. Low-power processor 222 includes logic for managing the other elements of the device 210. As described above, for example, low power processor 222 may accept user input signals from an interface 216. Low-power processor 222 may also be configured to receive input signals or instruction communications from client device 290 via low-power wireless connection 225. Additional details related to such instructions are described further below. Low-power wireless circuitry 224 includes circuit elements for implementing a low-power wireless communication system. Bluetooth™ Smart, also known as Bluetooth™ low energy, is one standard implementation of a low power wireless communication system that may be used to implement low-power wireless circuitry 224. In other embodiments, other low power communication systems may be used.

High-speed circuitry 230 includes high-speed processor 232, memory 234, and high-speed wireless circuitry 236. High-speed processor 232 may be any processor capable of managing high-speed communications and operation of any general computing system needed for device 210. High speed processor 232 includes processing resources needed for managing high-speed data transfers on high-speed wireless connection 237 using high-speed wireless circuitry 236. In certain embodiments, the high-speed processor 232 executes an operating system such as a LINUX operating system or other such operating system such as operating system 904 of FIG. 9. In addition to any other responsibilities, the high-speed processor 232 executing a software architecture for the device 210 is used to manage data transfers with high-speed wireless circuitry 236. In certain embodiments, high-speed wireless circuitry 236 is configured to implement Institute of Electrical and Electronic Engineers (IEEE) 802.11 communication standards, also referred to herein as Wi-Fi. In other embodiments, other high-speed communications standards may be implemented by high-speed wireless circuitry 236.

Memory 234 includes any storage device capable of storing camera data generated by the camera 214 and video processor 212. While memory 234 is shown as integrated with high-speed circuitry 230, in other embodiments, memory 234 may be an independent standalone element of the device 210. In certain such embodiments, electrical routing lines may provide a connection through a chip that includes the high-speed processor 232 from the video processor 212 or low-power processor 222 to the memory 234. In other embodiments, the high-speed processor 232 may manage addressing of memory 234 such that the low-power processor 222 will boot the high-speed processor 232 any time that a read or write operation involving memory 234 is needed.

Embodiments of the device 210 may provide for reduced power consumption when compared to existing solutions. In some aspects, the device 210 may capture image data and tag the image data with location information indicating a location where the capture occurred. These embodiments may not maintain the satellite receiver in a state such that it is always able to obtain location information. Instead, the satellite receiver may be kept in a low power state to reduce power consumption of the device 210. In response to a need for location information, the satellite receiver 217 may be transitioned out of the low power state into a higher power or operative state, such that the satellite receiver may obtain location information. However, between the time that the image data is captured and the satellite receiver is able to obtain a "fix" from signals received from satellites, the mobile device may have moved from a first location to a second location. However, it is still; desirable to tag the captured image data with location information indicating the first location, and not the second location. To retrospectively determine the first location, the disclosed embodiments may combine information from the accelerometer 215 with location information obtained from the satellite receiver 217 to determine the first location, as discussed in more detail below.

Figure 3:
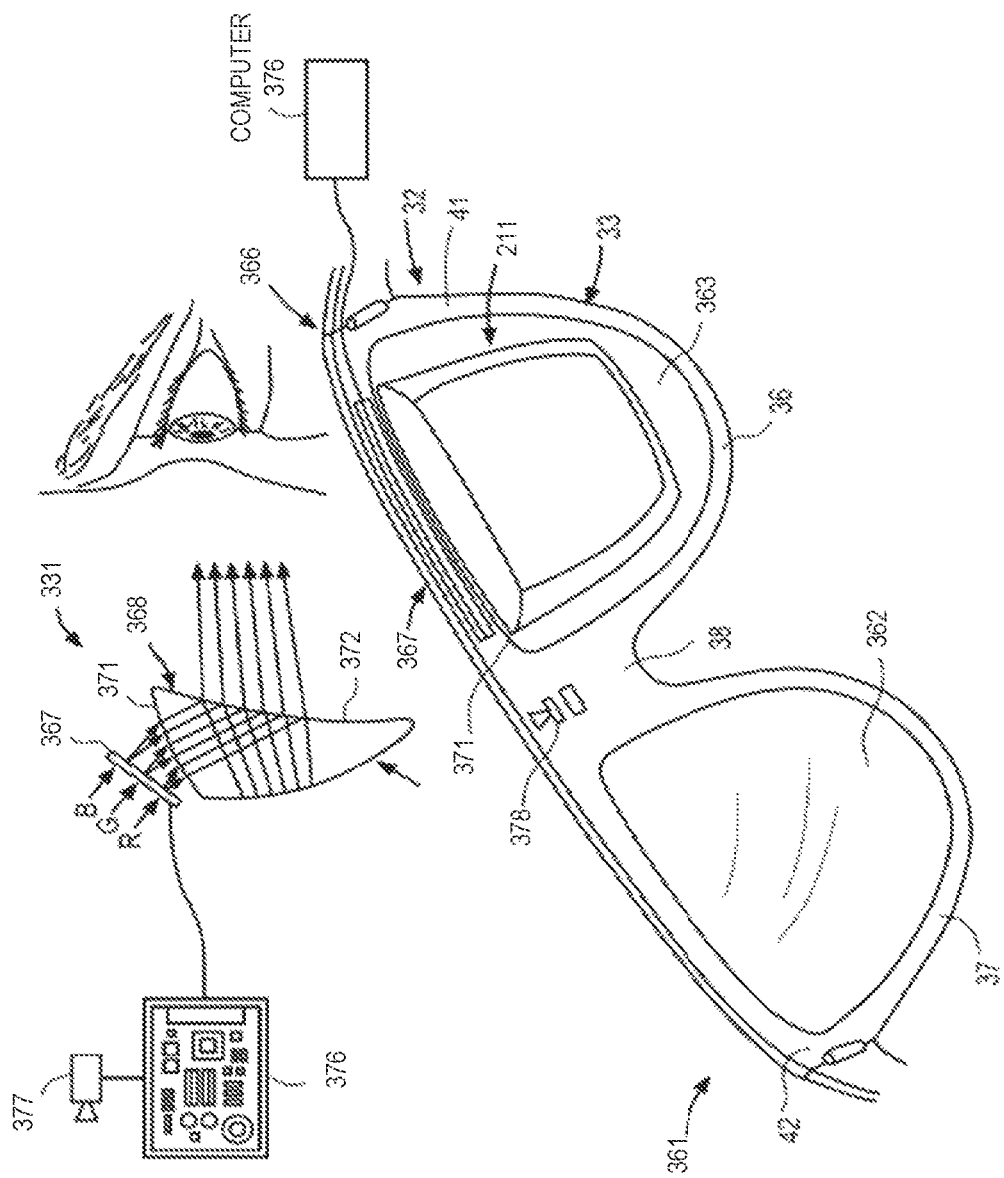
FIGS. 3 and 4 illustrate wearable devices including transmission components, according to certain example embodiments.
Figure 4:
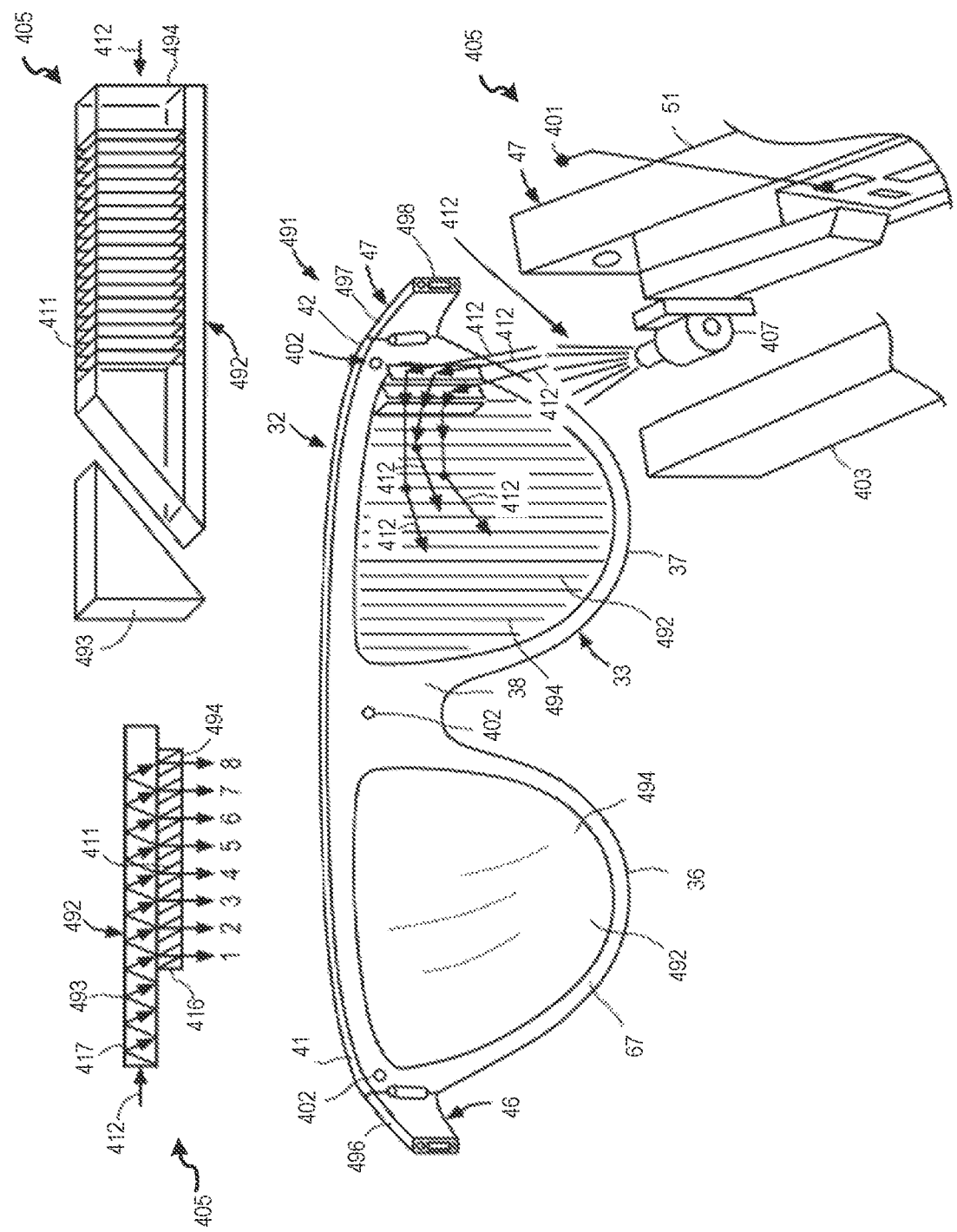

FIGS. 3 and 4 illustrate two embodiments of glasses which include display systems. In various different embodiments, such display systems may be integrated with the camera devices discussed above, or may be implemented as wearable devices without an integrated camera. In embodiments without a camera, power conservation systems and methods continue to operate for the display system and other such systems in a manner similar to what is described above for the video processor and data transfer elements of the camera devices.

FIG. 3 illustrates glasses 361 having an integrated display 211. The glasses 361 can be of any suitable type, including glasses 31, and like reference numerals have been used to describe like components of glasses 361 and 31. For simplicity, only a portion of the glasses 361 are shown in FIG. 3. Headwear or glasses 361 can optionally include left and right optical lenses 362, 563 secured within respective left and right optical element holders 36, 37. The glasses 361 can additionally include any suitable left and right optical elements or assemblies 366, which can be similar to any of the optical elements or assemblies discussed herein including optical elements 43, 44 of glasses 31. Although only one optical assembly 366 is shown in FIG. 3, it is appreciated that an optical assembly 366 can be provided for both eyes of the user.

In one embodiment, the optical assembly 366 includes any suitable display matrix 367. Such a display matrix 367 can be of any suitable type, such as a liquid crystal display (LCD), an organic light-emitting diode (OLED) display, or any other such display. The optical assembly 366 also includes an optical layer or layers 368, which can be include lenses, optical coatings, prisms, mirrors, waveguides, and other optical components in any combination. In the embodiment illustrated in FIG. 3, the optical layer 368 is a prism having a suitable size and configuration and including a first surface 371 for receiving light from display matrix 367 and a second surface 372 for emitting light to the eye of the user. The prism extends over all or at least a portion of the optical element holder 36, 37 so to permit the user to see the second surface 372 of the prism when the eye of the user is viewing through the corresponding optical element holder 36. The first surface 371 faces upwardly from the frame 32 and the display matrix 367 overlies the prism so that photons and light emitted by the display matrix 367 impinge the first surface 371. The prism is sized and shaped so that the light is refracted within the prism and is directed towards the eye of the user by the second surface 372. In this regard, the second surface 372 can be convex so as to direct the light towards the center of the eye. The prism can optionally be sized and shaped so as to magnify the image projected by the display matrix 367, and the light travels through the prism so that the image viewed from the second surface 372 is larger in one or more dimensions than the image emitted from the display matrix 367.

Glasses 361 can include any suitable computing system, including any of the computing devices disclosed herein, such as computer 61, 210 or machine 1000. In the embodiment of FIG. 3, computer 376 powered by a suitable rechargeable battery (not shown), which can be similar to battery 62, is provided. Computer 376 can receive a data stream from one or more image sensors 377, which may be similar to camera 69, or the camera 214, with image sensors 377 positioned such that the image sensor 377 senses the same scene as an eye of a wearer of glasses 361. Additional sensors, such as outwardly-facing geometry sensor 378, can be used for any suitable purpose, including the scanning and capturing of three-dimensional geometry that may be used by computer 376 with data from image sensors 377 to provide information via digital display matrix 367.

Computer 376 may be implemented using the processor elements of the device 210, including video processor 212, high-speed circuitry 230, and low-power circuitry 220. Computer 376 may additionally include any circuitry needed to power and process information for display matrix 367, which may be similar to display 211. In certain embodiments, video processor 212 or high-speed processor 232 may include circuitry to drive display matrix 367. In other embodiments, separate display circuitry may be integrated with the other elements of computer 376 to enable presentation of images on display matrix 367.

In various embodiments, the computer 376 may include an accelerometer, such as accelerometer 215. In some embodiments, the computer 376 may include a satellite receiver, such as satellite receiver 217. The disclosed embodiments may function to reduce power consumption of the computer 376 and/or the satellite receiver.

FIG. 4 illustrates another example embodiment, shown as glasses 491, having another implementation of a display. Just as with glasses 361, glasses 491 can be of any suitable type, including glasses 31, and reference numerals have again been used to describe like components of glasses 491 and 361. Glasses 491 include optical lenses 492 secured within each of the left and right optical element holders 36, 37. The lens 492 has a front surface 493 and an opposite rear surface 494. The left and right end portions 41, 42 of the frame front piece 33 can include respective left and right frame extensions 496, 497 that extend rearward from the respective end portions 41, 42. Left and right temple pieces 46, 47 are provided, and can either be fixedly secured to respective frame extensions 496, 497 or removably attachable to the respective frame extensions 496, 497. In one embodiment, any suitable connector mechanism 498 is provided for securing the temple pieces 46, 47 to the respective frame extension 496, 497.

Glasses 491 includes computer 401, and just as with computer 376, computer 401 may be implemented using the processor elements of device 210, including video processor 212, high-speed circuitry 230, and low-power circuitry 220, and computer 401 may additionally include any circuitry needed to power and process information for the integrated display elements.

Sensors 402 include one or more cameras, which may be similar to camera 214 and/or other digital sensors that face outward, away from the user. The data feeds from these sensors 402 go to computer 401. In the embodiment of FIG. 4 the computer 401 is disposed within the first portion 51 of right temple piece 47, although the computer 401 could be disposed elsewhere in alternative embodiments. In the embodiment of FIG. 4, right temple piece 47 includes removable cover section 403 for access to computer 401 or other electronic components of glasses 491.

Glasses 491 include optical elements or assemblies 405, which may be similar to any other optical elements or assemblies described herein. One optical assembly 405 is shown, but in other embodiments, optical assemblies may be provided for both eyes of a user. Optical assembly 405 includes laser projector 407, which is a three-color laser projector using a scanning mirror or galvanometer. During operation, an optical source such as a laser projector is disposed in one of the arms or temples of the glasses, and is shown in right temple piece 47 of glasses 491. The computer 401 connects to the laser projector 407. The optical assembly 605 includes one or more optical strips 411. The optical strips 411 are spaced apart across the width of lens 492, as illustrated by lens 492 in right optical element holder 37 of FIG. 4. In other embodiments, the optical strips 411 may be spaced apart across a depth of the lens 492 between the front surface 493 and the rear surface 494 of lens 492 as shown in the partial view of lens 492 in the top corner of FIG. 4.

During operation, computer 401 sends data to laser projector 407. A plurality of light paths 412 are depicted, showing the paths of respective photons emitted by the laser projector 407. The path arrows illustrate how lenses or other optical elements direct the photons on paths 412 that take the photons from the laser projector 407 to the lens 492. As the photons then travel across the lens 492, the photons encounter a series of optical strips 411. When a particular photon encounters a particular optical strip 411, it is either redirected towards the user's eye, or it passes to the next optical strip 411. Specific photons or beams of light may be controlled by a combination of modulation of laser projector 407 and modulation of optical strips 411. Optical strips 411 may, in certain embodiments, be controlled through mechanical, acoustic, or electromagnetic signals initiated by computer 401.

In one example implementation of the optical strips 411, each strip 411 can use Polymer Dispersed Liquid Crystal to be opaque or transparent at a given instant of time, per software command from computer 401. In a different example implementation of the optical strips 411, each optical strip 411 can have a specific wavelength of light that it redirects toward the user, passing all the other wavelengths through to the next optical strip 411. In a different example implementation of the optical strips 411, each strip 411 can have certain regions of the strip 411 that cause redirection with other regions passing light, and the laser projector 407 can use high precision steering of the light beams to target the photons at the desired region of the particular intended optical strip 411.

In the embodiment of lens 492 illustrated in the top left of FIG. 4, optical strips 411 are disposed in and spaced apart along the width of a first layer 416 of the lens 492, which is secured in a suitable manner to a second layer 417 of the lens 492. In one embodiment, the front surface 493 is formed by the second layer 417 and the rear surface 494 is formed by the first layer 416. The second layer 417 can be provided with reflective coatings on at least a portion of the surfaces thereof so that the laser light bounces off such surfaces so as to travel along the layer 417 until the light encounters a strip 411 provided in the first layer 416, and is either redirected towards the eye of the user or continues on to the next strip 411 in the manner discussed above.

In various embodiments, the computer 401 may include a satellite receiver, such as the satellite receiver 217, discussed above with respect to FIG. 2. The satellite receiver and/or computer 401 may consume power as part of glasses 491 operations for acquiring a location of the glasses 491, for example, when tagging a captured image or video with location information. Embodiments described herein may function to reduce power consumption of the computer 401 and/or satellite receiver 217 in wearable devices such as glasses 491.

Figure 5:
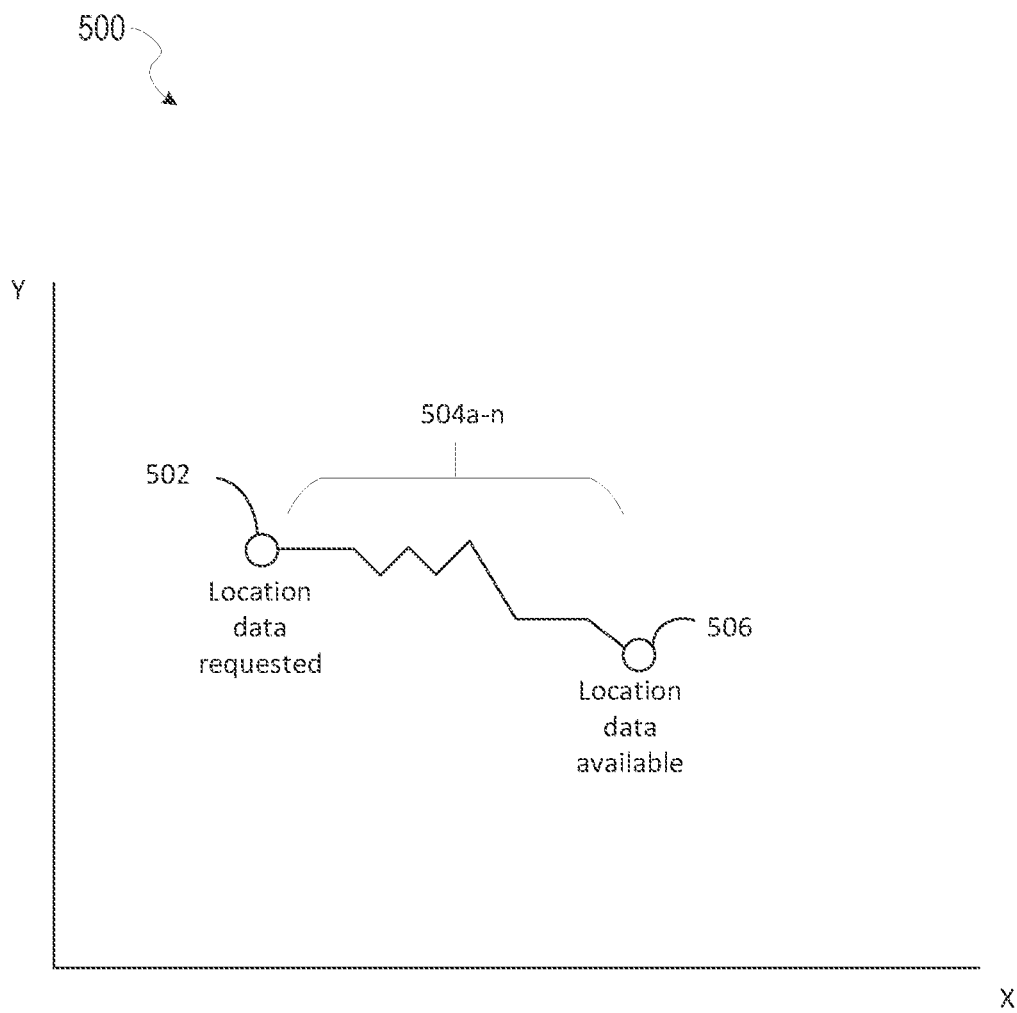
FIG. 5 is an illustration of how a combination of an accelerometer and a satellite receiver may be utilized to obtain location data, according to some example embodiments.

FIG. 5 is an illustration of how a combination of an accelerometer and a satellite receiver may be utilized to obtain location data. For ease of illustration, FIG. 5 illustrates the use of an accelerometer and a satellite receiver to obtain two dimensional location data over two dimensions represented by an X and Y axis. However, the process illustrated by FIG. 5 may be easily extended to three dimensions without departing from the contemplated embodiments.

FIG. 5 illustrates an initial location 502. A mobile device may be positioned at location 502 when a request for location data is received. The request may be initiated by, for example, a photo or video application that seeks to tag the video or photo with location information. However, when the request is received, the mobile device may have its satellite receiver in a low power state, such that the mobile device is unaware of its present location at location 502. After the request for location data is received by the mobile device, the mobile device may change the state of its satellite receiver to a higher power state, such that the satellite receiver may determine a position of the mobile device. However, the satellite receiver may require several seconds or longer to transition from its low power state to a state where it has determined a present location of the mobile device.

Upon receiving the request for location data at location 502, the mobile device may also record measurements from an on-board accelerometer. These measurements are graphically illustrated over the two dimensional space of FIG. 5 by points 504*a-n*. The points 504*a-n* may be recorded over a time period. At the end of the time period, the satellite receiver may provide a current location of the mobile device 506. The disclosed embodiments may determine the coordinates of the location 502 based on the location 506 and the acceleration measurements 5504*a-n*.

Figure 6:
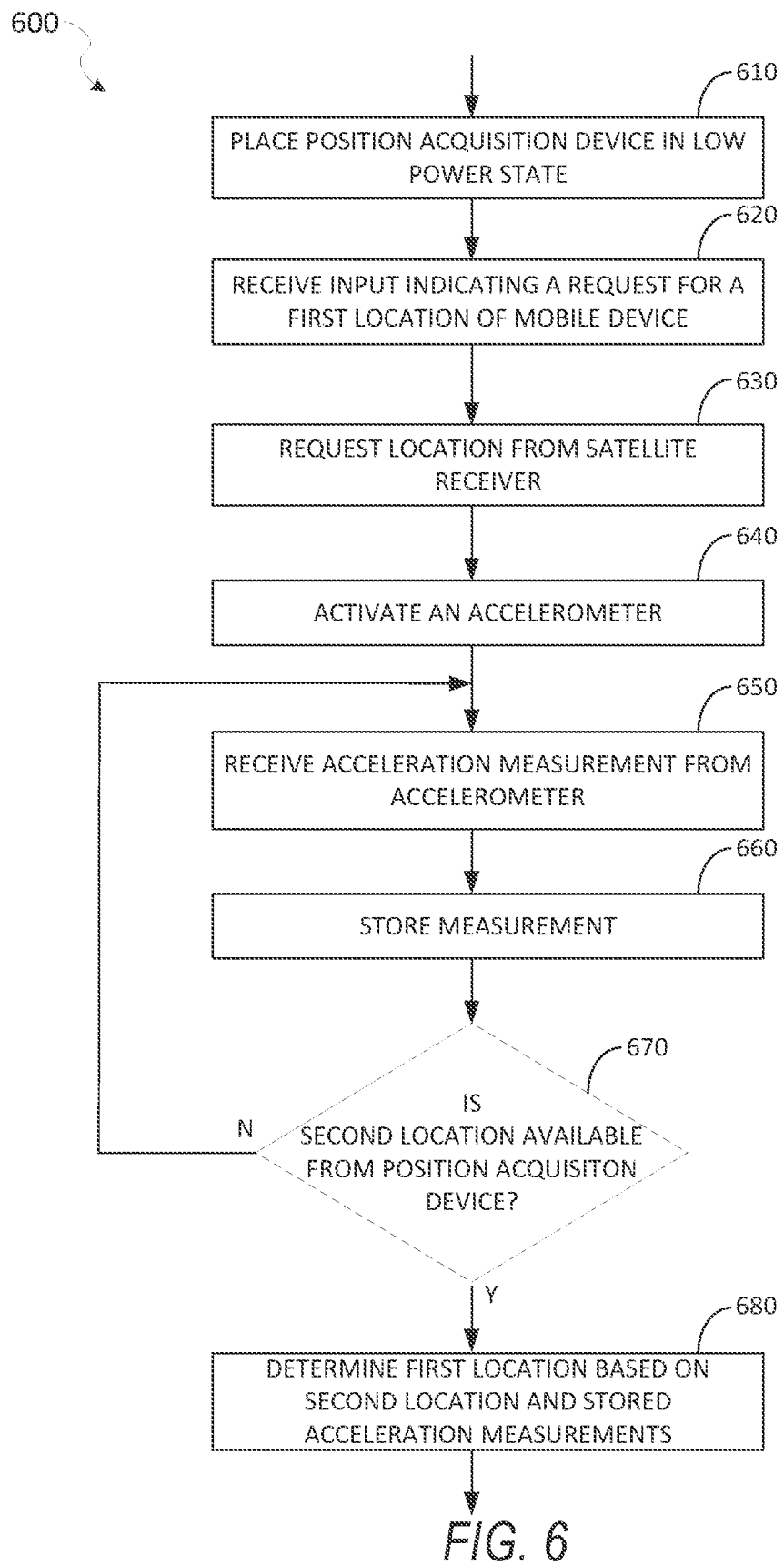
FIG. 6 is a flowchart of a method for determining a location of a mobile device, according to some example embodiments.

FIG. 6 is a flowchart of a method for determining a location of a device. In some aspects, the device may be a mobile or portable device. In some aspects, the device may be a phone. In some aspects, one or more of the functions discussed below with respect to FIG. 6 may be performed by one or more of the computer 61, computer 376, computer 401, and/or the device 210. In some aspects, the process 600 discussed below may be performed by the low power processor 222. A device executing process 600 may be referred to below as the "executing device."

In block 610, a satellite receiver is put into a low power state. For example, in some aspects, block 610 may turn off all power to the satellite receiver. In some other aspects, the satellite receiver may be placed in a stand by state, where some power may be consumed by the satellite receiver, but the satellite receiver is unable to determine a present location. In some aspects, the satellite receiver may be the satellite receiver 217, discussed above with respect to FIG. 2.

In block 620, input is received indicating a request for a first location of the executing device. In some aspects, block 620 may process a command to capture an image, for example, using a camera of a wearable device, such as the glasses discussed above with respect to any of FIGS. 1-4. The command may be initiated by a user depressing a button, which may be one embodiment of the interface 216. The command to capture an image may also include a command to record a location of the wearable device at a time when the image is captured. For example, the wearable device may, in some aspects, include configurable settings. One of the configurable settings may indicate whether location information is to be captured and stored when an image is captured and stored.

Thus, the request for the first location may be a result of the command that includes the request for the location. In some aspects, the location may be stored as meta-data in a file storing the captured image.

The first location may correspond to a location of the executing device when the request is received. Since the satellite receiver is in the low power state, as described above with respect to block 610, a current location of the executing device cannot be obtained from the satellite receiver at the time the input is received in block 620. In some aspects, process 600 includes capturing a photo or video with a executing device and attempting to tag the photo or video with location data indicating the location of the executing device. The attempt to tag may generate the input of block 620.

In block 630, the satellite receiver is requested to provide location information. Block 630 may include transitioning the satellite receiver from the low power state of block 630 to a higher power state. The higher power state may be a state that allows the satellite receiver to receive signals from one or more satellites, and is further able to compute a present location based on the received signals.

Upon entering the higher power state, the satellite receiver may begin a process of establishing a position "fix" based on the received signals. Obtaining a fix may require several seconds or longer. For example, depending on a quality of satellite signal reception, achieving a position "fix" could require anywhere between one (1) second and ninety (90) seconds in some aspects. In some conditions, a fix could require an even longer period of time.

In block 640, an accelerometer is activated. In some aspects, the accelerometer may remain activated at all times and thus in some aspects block 640 may not be performed. In other aspects, the accelerometer may be transitioned from an inactive state, which may consume a lower amount of power, to an active state, which may consume more power than the inactive state. In some aspects, a polling rate or measurement rate of the accelerometer may be more frequent in the active state than in the inactive state.

In block 650, an acceleration measurement is received from the accelerometer. In some aspects, the acceleration measurement includes accelerations in three dimensions, such as an X, Y, and Z direction. The accelerations may include both positive and negative values.

In block 660, the acceleration measurement received in block 650 is stored to a non-transitory data store. For example, the acceleration measurement may be stored to a memory buffer or a hard disk. In some aspects, the acceleration measurement may be stored using an image processor (e.g., 212). As discussed further below, some image processors may be equipped with storage capacity that is unused, and thus may be used as a secondary storage device.

Decision block 670 determines whether a second location is available from the satellite receiver. In other words, decision block 670 determines whether the satellite receiver has been able to obtain a "fix", which will provide present location data for the executing device.

If the fix has been obtained, the second location information is available. If so, process 600 moves to block 680, which determines the first location based on the second location and the stored acceleration measurements. Note that the executing device was present at the first location prior to collection of the stored acceleration measurements and determination of the executing device's position at the second location. In some aspects, the first location and an image are written to a file. The file may be written to an output device, such as a network card, (e.g. the file included in a network packet transmitted onto the network), or a stable storage device (e.g., a hard disk or memory disk).

If the fix has not yet been obtained, the second location information is not yet available. In this case, process 600 moves from decision block 670 to block 650, which receives an additional acceleration measurement from the accelerometer. In some aspects, the transition from block 670 to block 650 may include a waiting period of at least a predefined duration. This may avoid too frequent "polling" of the accelerometer for new measurement information, which would needlessly consume power.

Figure 7:
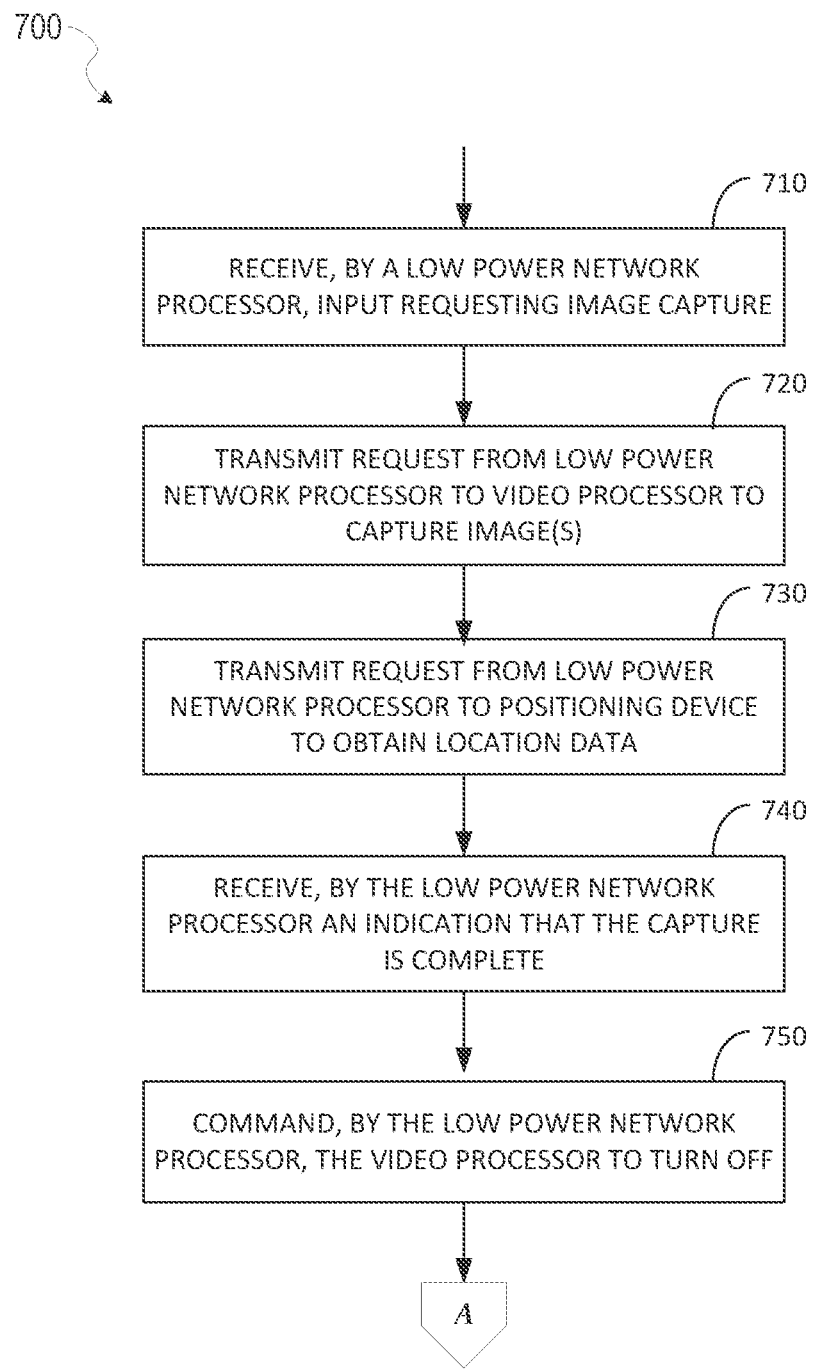
FIG. 7 is a flowchart of a method for determining a first location of a mobile device, according to some example embodiments.

FIG. 7 is a flowchart of a method for determining a first location of a device. In some aspects, the device is a mobile device. In some aspects, the device is a phone. In some aspects, one or more of the functions discussed below with respect to FIG. 7 may be performed by one or more of the computer 61, computer 376, computer 401, and/or the device 210. In some aspects, one or more of the functions discussed below with respect to FIG. 7 and process 700 may be performed by the low power processor 222. While the description of process 700 below indicates functions performed by a low power network processor, in some other aspects, these functions may instead be performed by an image processor, such as the image processor 212. In some aspects, the image processor 212 may be an Ambarella® (AMBA) processor.

In block 710, a low power network processor receives input requesting capture of an image. For example, in some aspects, the interface 216 may receive input, for example, via a button press on a mobile device, that an image, either a snapshot image or a video, is to be captured with the camera 214. The input may be passed from the interface 216 to the low power processor 222 in some aspects.

In block 720, the low power network processor transmits a request to a video processor to begin image capture. The image capture may be for a snapshot (single) image or for a video. For example, in some aspects, the low power processor 222 may send a request to the image processor 212 to capture one or more images with the camera 214. At the time the image capture process begins, the device performing process 700 ("executing device") is positioned at the first location.

In block 730, the low power network processor transmits a request to a satellite receiver (e.g., 217) to obtain second location information. The second location information may indicate a different location than the first location, depending on movement of the executing device between the time the image capture process starts/ends and a later time when a position fix is obtained by a satellite receiver, as discussed further below.

Prior to the start of process 700, the satellite receiver may be in a low power state, such that it is unable to acquire a fix or otherwise obtain location information. Block 730 may cause the satellite receiver to begin a process to receive satellite signals and establish a current position. Thus, block 730 may move the satellite receiver from a lower (e.g. inoperative for establishing location information) power state to a higher (e.g. operative to establish location) state. In some aspects, the low power processor 222 may send the request to the satellite receiver 217. Some period of time may be required before the satellite receiver is able to determine position information after being required to move out of the low power state. While the present disclosure uses a satellite receiver as an example of a positioning determining device, in various aspects, other types of positioning devices may be employed by various embodiments. For example, some positioning devices may not rely on satellites, but may instead rely on signals from cell phone towers, other wireless devices, or even an image of a sky and a time of year.

In block 740, the low power network processor receives an indication that the image capture is complete. In some aspects, the low power network processor 222 may receive an indication from the image processor 212 that a snapshot capture or video capture (e.g. whatever type of capture was requested in block 720) has finished. This completion may be in response to a command from a user, such as a button press. Alternatively, the completion may be a result of a single image capture process being completed. In some aspects, the low power network processor may also receive an identifier from the video processor indicating a location of the captured image data. For example, in some aspects, the video processor 212 may indicate a location in the memory 234 that stores the captured image data. In some aspects, this indication may take the form of a file identifier for a file system implemented in the memory 234. In some aspects, the low power network processor may store the file identifier in a local memory or cache of the low power network processor.

In block 750, the low power network processor commands the video processor to enter a low power state or to turn off. Since the image capture is complete (per block 740), there is no longer a need to consume additional power with the video processor. In some aspects, the low power processor 222 sends the command to the video processor 212. In some aspects, block 750 is in response to the reception of the indication in block 740. After block 750, process 700 transitions through off-page reference "A", and is discussed further below with respect to FIG. 8.

Figure 8:
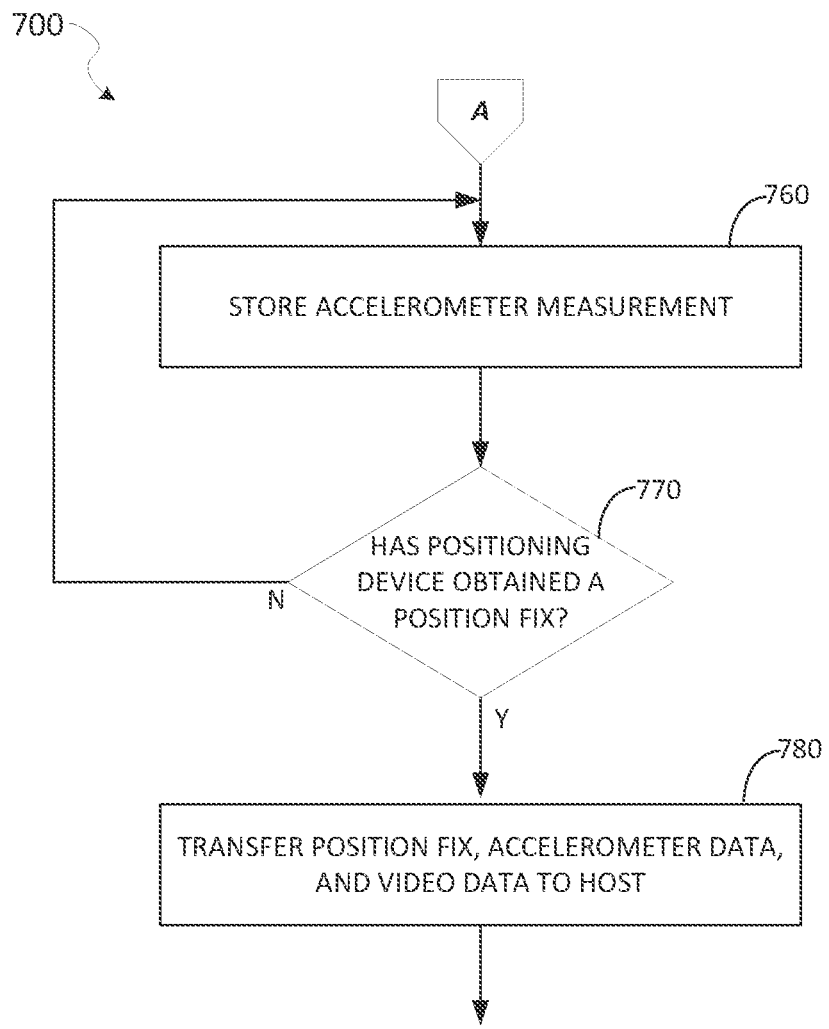
FIG. 8 is a continuation of process 700 discussed above with respect to FIG. 7, according to some example embodiments.

FIG. 8 is a continuation of process 700 discussed above with respect to FIG. 7. In block 760, an acceleration measurement is obtained from an accelerometer. The measurement may be stored in a memory in block 760. In some aspects, the low power network processor 222 may store the measurement in an on board cache. In decision block 770, process 700 determines whether the satellite receiver has been able to obtain a position fix. If not, processing returns to block 760 and another acceleration measurement may be stored. In some aspects, an additional wait block may occur between decision block 750 and 760. This may prevent too frequent polling of the accelerometer and/or collection of accelerometer data.

Some aspects of block 760 may include sending a command to the image processor to turn on and storing one or more accelerometer measurements. For example, in some aspects, a total storage necessary to store the accelerometer measurements of multiple iterations of block 760 may exceed a local storage capacity of the low power network processor. In these aspects, the low power network processor may utilize an image processor as a secondary storage device. After the portion of accelerometer measurements are transferred to the image processor for persistent storage, the low power network processor may command the image processor to turn itself off to save power. Thus, process 700 may iteratively collect acceleration measurements at a defined frequency, such as once per millisecond, once per microsecond, or other periodicity. This collection of measurements may be stored so as to track motion of the executing device until the position determination device (e.g. satellite receiver 217) has been able to obtain a current position, as discussed below.

If the satellite receiver has obtained a position fix, then process 700 moves from decision block 770 to block 780. The low power network processor may receive the position fix or location information from the satellite receiver, and store it in a local cache in some aspects. In some aspects, the low power network processor may then transfer the location information, accelerometer measurement data, and the captured image data over a network to a host, or in other words, another computer, in block 780. For example, the other computer may have access to more computing resources and/or power resources, and thus the computations necessary to compute a location tag for the image data may be performed at the other computer without consuming the power necessary on the mobile device performing process 700. In some other aspects, block 770 may command the image processor 212 to determine the first location based on the location information obtained from the satellite receiver, and the acceleration measurements. The image processor 212 may also tag the captured image data with the determined first location information.

Figure 9:
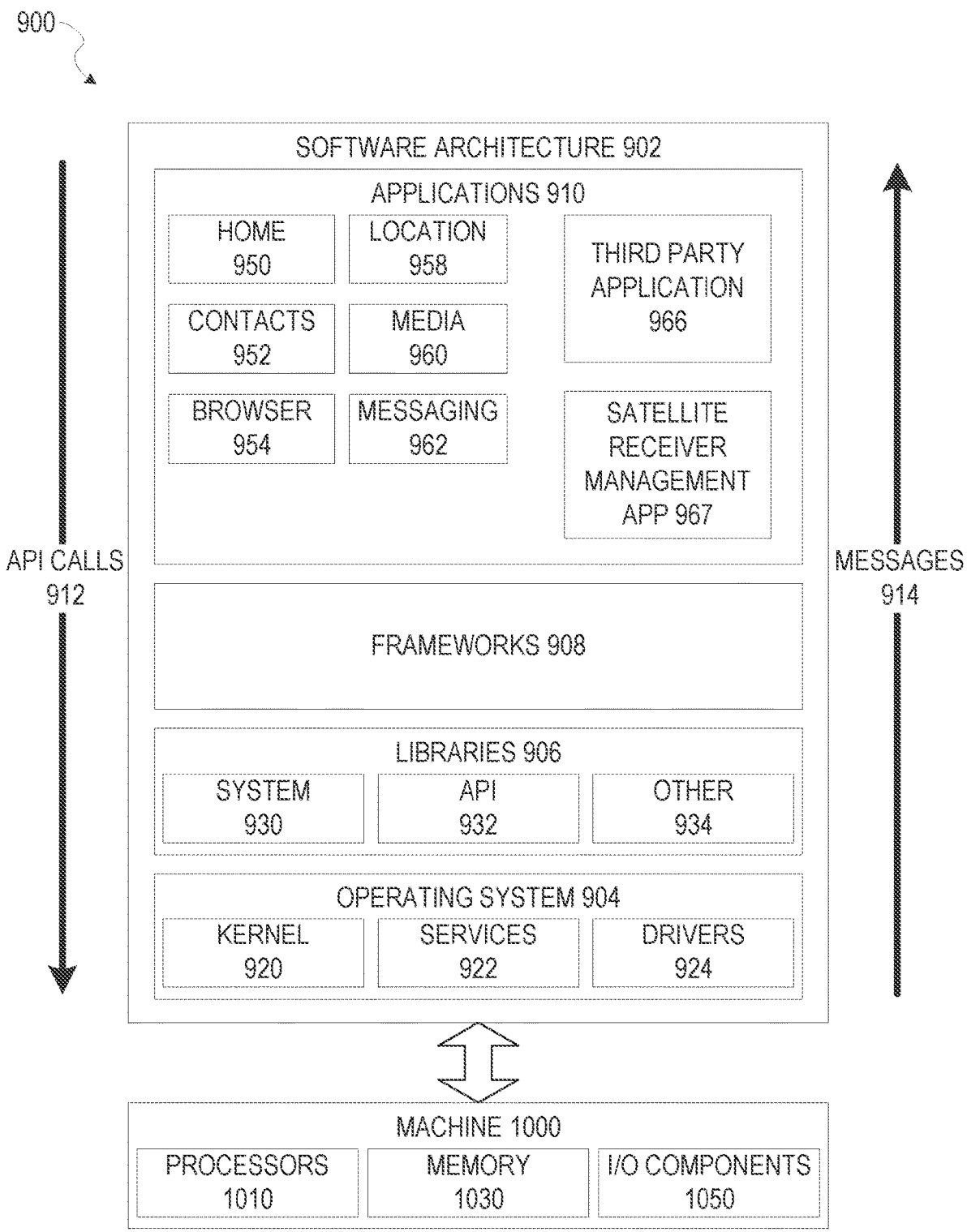
FIG. 9 is a block diagram illustrating an example of a software architecture that may be installed on a machine, according to some example embodiments.

FIG. 9 is a block diagram 900 illustrating an architecture of software architecture 902, which can be installed on any one or more of the devices described above. FIG. 9 is merely a non-limiting example of a software architecture, and it will be appreciated that many other architectures can be implemented to facilitate the functionality described herein. In various embodiments, the software architecture 902 is implemented by hardware such as computer 61, device 210, computer 376, and/or computer 401 of FIGS. 1, 2, 3, and 4 respectively. In some aspects, the software 902 may be executed by a machine 1000 of FIG. 10, discussed below. The software architecture 902 may include a stack of layers where each layer may provide a particular functionality. For example, the software architecture 902 may include one or more layers such as an operating system 904, libraries 906, frameworks 908, and applications 910. Operationally, the applications 910 invoke application programming interface (API) calls 912 through the software stack and receive messages 914 in response to the API calls 912, consistent with some embodiments. In various embodiments, any client device 290, server computer of a server system 298, or any other device described herein may operate using elements of software architecture 902. Devices such as the device 210 may additionally be implemented using aspects of software architecture 902, with the architecture adapted for operating using low-power circuitry (e.g., low-power circuitry 220) and high-speed circuitry (e.g., high-speed circuitry 230) as described herein.

In various implementations, the operating system 904 manages hardware resources and provides common services. The operating system 904 includes, for example, a kernel 920, services 922, and drivers 924. The kernel 920 acts as an abstraction layer between the hardware and the other software layers consistent with some embodiments. For example, the kernel 920 provides memory management, processor management (e.g., scheduling), component management, networking, and security settings, among other functionality. The services 922 can provide other common services for the other software layers. The drivers 924 are responsible for controlling or interfacing with the underlying hardware, according to some embodiments. For instance, the drivers 924 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth. In certain implementations of a device such as the device 210, low-power circuitry may operate using drivers 924 that only contain BLUETOOTH® Low Energy drivers and basic logic for managing communications and controlling other devices, with other drivers operating with high-speed circuitry.

In some embodiments, the libraries 906 provide a low-level common infrastructure utilized by the applications 910. The libraries 906 can include system libraries 930 (e.g., C standard library) that can provide functions such as memory allocation functions, string manipulation functions, mathematic functions, and the like. In addition, the libraries 906 can include API libraries 932 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 906 can also include a wide variety of other libraries 934 to provide many other APIs to the applications 910.

The frameworks 908 provide a high-level common infrastructure that can be utilized by the applications 910, according to some embodiments. For example, the frameworks 908 provide various graphic user interface (GUI) functions, high-level resource management, high-level location services, and so forth. The frameworks 908 can provide a broad spectrum of other APIs that can be utilized by the applications 910, some of which may be specific to a particular operating system or platform.

In an example embodiment, the applications 910 may include a home application 950, a contacts application 952, a browser application 954, a location application 958, a media application 960, a messaging application 962, and a broad assortment of other applications such as a third party application 966. According to some embodiments, the applications 910 are programs that execute functions defined in the programs. Various programming languages can be employed to create one or more of the applications 910, structured in a variety of manners, such as object-oriented programming languages (e.g., Objective-C, Java, or C++) or procedural programming languages (e.g., C or assembly language). In a specific example, the third party application 966 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating systems. In this example, the third party application 966 can invoke the API calls 912 provided by the operating system 904 to facilitate functionality described herein.

Embodiments described herein may particularly interact with satellite receiver management application 967. Such an application 967 may interact with motion component 1058 and/or position component 1062, discussed below with respect to FIG. 10, to provide location information while managing power consumption, as discussed above, for example, with respect to any of FIGS. 5-8.

The software architecture of FIG. 9 illustrates an example architecture that may be implemented in some embodiments by a wearable device executing a mobile operating system (e.g., IOS™, ANDROID™, WINDOWS® Phone, or other mobile operating systems), consistent with some embodiments. In one embodiment, the wearable device detects touch inputs from the user via the information provided by an acceleration sensor or inertial measurement unit.

Figure 10:
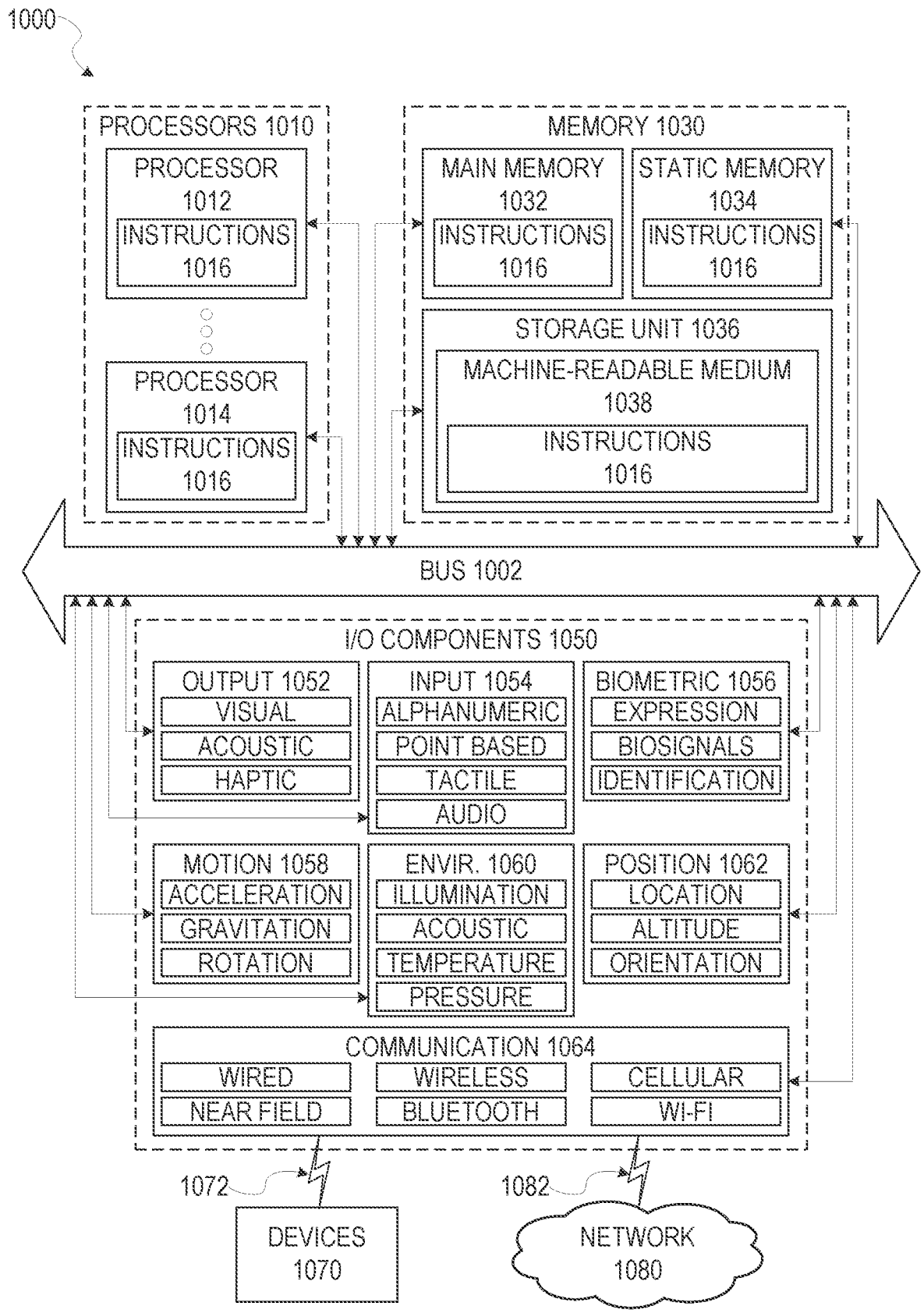
FIG. 10 illustrates a diagrammatic representation of a machine in the form of a computer system within which a set of instructions may be executed for causing the machine to perform any one or more of the methodologies discussed herein.

FIG. 10 shows a diagrammatic representation of a machine 1000 in the example form of a computer system, within which instructions 1016 (e.g., software, a program, an application, an applet, an app, or other executable code) for causing the machine 1000 to perform any one or more of the methodologies discussed herein can be executed. In alternative embodiments, the machine 1000 operates as a standalone device or can be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1016, sequentially or otherwise, that specify actions to be taken by the machine 1000. Further, while only a single machine 1000 is illustrated, the term "machine" shall also be taken to include a collection of machines 1000 that individually or jointly execute the instructions 1016 to perform any one or more of the methodologies discussed herein.

In various embodiments, the machine 1000 comprises processors 1010, memory 1030, and I/O components 1050, which can be configured to communicate with each other via a bus 1002. In an example embodiment, the processors 1010 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) include, for example, a processor 1012 and a processor 1014 that may execute the instructions 1016. The term "processor" is intended to include multi-core processors that may comprise two or more independent processors (also referred to as "cores") that can execute instructions contemporaneously. Although FIG. 10 shows multiple processors 1010, the machine 1000 may include a single processor with a single core, a single processor with multiple cores (e.g., a multi-core processor), multiple processors with a single core, multiple processors with multiples cores, or any combination thereof.

The memory 1030 comprises a main memory 1032, a static memory 1034, and a storage unit 1036 accessible to the processors 1010 via the bus 1002, according to some embodiments. The storage unit 1036 can include a machine-readable medium 1038 on which are stored the instructions 1016 embodying any one or more of the methodologies or functions described herein. The instructions 1016 can also reside, completely or at least partially, within the main memory 1032, within the static memory 1034, within at least one of the processors 1010 (e.g., within the processor's cache memory), or any suitable combination thereof, during execution thereof by the machine 1000. Accordingly, in various embodiments, the main memory 1032, the static memory 1034, and the processors 1010 are considered machine-readable media 1038.

As used herein, the term "memory" refers to a machine-readable medium 1038 able to store data temporarily or permanently and may be taken to include, but not be limited to, random-access memory (RAM), read-only memory (ROM), buffer memory, flash memory, and cache memory. While the machine-readable medium 1038 is shown in an example embodiment to be a single medium, the term "machine-readable medium" should be taken to include a single medium or multiple media (e.g., a centralized or distributed database, or associated caches and servers) able to store the instructions 1016. The term "machine-readable medium" shall also be taken to include any medium, or combination of multiple media, that is capable of storing instructions (e.g., instructions 1016) for execution by a machine (e.g., machine 1000), such that the instructions, when executed by one or more processors of the machine 1000 (e.g., processors 1010), cause the machine 1000 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 1050 include a wide variety of components to receive input, provide output, produce output, transmit information, exchange information, capture measurements, and so on. In general, it will be appreciated that the I/O components 1050 can include many other components that are not shown in FIG. 10. The I/O components 1050 are grouped according to functionality merely for simplifying the following discussion, and the grouping is in no way limiting. In various example embodiments, the I/O components 1050 include output components 1052 and input components 1054. The output components 1052 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1054 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1050 include biometric components 1056, motion components 1058, environmental components 1060, or position components 1062, among a wide array of other components. For example, the biometric components 1056 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1058 include acceleration sensor components (e.g., accelerometer), gravitation sensor components, rotation sensor components (e.g., gyroscope), and so forth. The environmental components 1060 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The environmental components, such as the temperature sensor components that detect ambient temperature, may be utilized to manage the temperature of electronic components discussed herein.

The position components 1062 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1050 may include communication components 1064 operable to couple the machine 1000 to a network 1080 or devices 1070 via a coupling 1082 and a coupling 1072, respectively. For example, the communication components 1064 include a network interface component or another suitable device to interface with the network 1080. In further examples, communication components 1064 include wired communication components, wireless communication components, cellular communication components, Near Field Communication (NFC) components, BLUETOOTH® components (e.g., BLUETOOTH® Low Energy), WI-FI® components, and other communication components to provide communication via other modalities. The devices 1070 may be another machine or any of a wide variety of peripheral devices (e.g., a peripheral device coupled via a Universal Serial Bus (USB)). As discussed above, in some aspects, the disclosed methods and systems may manage the transmission bandwidth of one or more of the wireless components (e.g. WiFi) and/or Bluetooth components in order to control an operating temperature of a device, such as the device 1000. In some aspects, the communication components 1064 included the low power circuitry 220 and/or high speed circuitry 230.

In some embodiments, the communication components 1064 detect identifiers or include components operable to detect identifiers. For example, the communication components 1064 include Radio Frequency Identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1064, such as location via Internet Protocol (IP) geo-location, location via WI-FI® signal triangulation, location via detecting an BLUETOOTH® or NFC beacon signal that may indicate a particular location, and so forth.

Transmission Medium

In various example embodiments, one or more portions of the network 1080 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a WI-FI® network, another type of network, or a combination of two or more such networks. For example, the network 1080 or a portion of the network 1080 may include a wireless or cellular network, and the coupling 1082 may be a Code Division Multiple Access (CDMA) connection, a Global System for Mobile communications (GSM) connection, or another type of cellular or wireless coupling. In this example, the coupling 1082 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 1016 are transmitted or received over the network 1080 using a transmission medium via a network interface device (e.g., a network interface component included in the communication components 1064) and utilizing any one of a number of well-known transfer protocols (e.g., Hypertext Transfer Protocol (HTTP)). Similarly, in other example embodiments, the instructions 1016 are transmitted or received using a transmission medium via the coupling 1072 (e.g., a peer-to-peer coupling) to the devices 1070. The term "transmission medium" shall be taken to include any intangible medium that is capable of storing, encoding, or carrying the instructions 1016 for execution by the machine 1000, and includes digital or analog communications signals or other intangible media to facilitate communication of such software.

Furthermore, the machine-readable medium 1038 is non-transitory (in other words, not having any transitory signals) in that it does not embody a propagating signal. However, labeling the machine-readable medium 1038 "non-transitory" should not be construed to mean that the medium is incapable of movement; the medium 1038 should be considered as being transportable from one physical location to another. Additionally, since the machine-readable medium 1038 is tangible, the medium 1038 may be considered to be a machine-readable device.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Certain embodiments are described herein as including logic or a number of components, modules, elements, or mechanisms. Such modules can constitute either software modules (e.g., code embodied on a machine-readable medium or in a transmission signal) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) is configured by software (e.g., an application or application portion) as a hardware module that operates to perform certain operations as described herein.

In some embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules are located in a single geographic location (e.g., within a home environment, an office environment, or a server farm). In other example embodiments, the processors or processor-implemented modules are distributed across a number of geographic locations.

What is claimed is:

1. A system comprising:
first hardware processing circuitry configured to perform operations comprising:
configuring a position acquisition device into a low power state such that the position acquisition device is unable to obtain a location of a wearable electronic device;
receiving, while the position acquisition device is in the low power state, a command to capture an image with a camera;
in response to receiving the command, determining, while the position acquisition device is in the low power state, that a configurable setting indicates that a first location is to be captured and stored in association with the image;
storing one or more acceleration measurements from an accelerometer based on the configurable setting until at least the position acquisition device obtains a second location;
determining the first location based on the one or more acceleration measurements and the second location; and
transmitting a message over a network to a second device, the message indicating the second location.

2. The system of claim 1, the operations comprising:
activating the accelerometer based on the configurable setting; and
in response to the command to capture the image and in response to activating the accelerometer, storing the one or more acceleration measurements from the accelerometer.

3. The system of claim 1, wherein the operations further comprise capturing the image with the camera in response to the command.

4. The system of claim 1, wherein the first hardware processing circuitry comprises a Bluetooth low energy network processor.

5. The system of claim 1, further comprising a second hardware processing circuitry, wherein the first hardware processing circuitry is further configured to perform operations comprising transferring the second location and the stored one or more acceleration measurements to the second hardware processing circuitry.

6. The system of claim 1, wherein the message includes the one or more acceleration measurements.

7. The system of claim 1, wherein the first hardware processing circuitry is configured to store the one or more acceleration measurements using an image processor.

8. The system of claim 1, wherein the first hardware processing circuitry is implemented as part of glasses.

9. A method comprising:
configuring a position acquisition device into a low power state such that the position acquisition device is unable to obtain a location of a wearable electronic device;
receiving, while the position acquisition device is in the low power state, a command to capture an image with a camera;
in response to receiving the command, determining, while the position acquisition device is in the low power state, that a configurable setting indicates that a first location is to be captured and stored in association with the image;
storing one or more acceleration measurements from an accelerometer based on the configurable setting until at least the position acquisition device obtains a second location;
determining the first location based on the one or more acceleration measurements and the second location; and
transmitting a message over a network to a second device, the message indicating the second location.

10. The method of claim 9, further comprising:
activating the accelerometer based on the configurable setting; and
in response to the command to capture the image and in response to activating the accelerometer, storing the one or more acceleration measurements from the accelerometer.

11. The method of claim 10, further comprising capturing the image in response to the command.

12. The method of claim 9, wherein first hardware processing circuitry that determines the first location comprises a Bluetooth low energy network processor.

13. The method of claim 9, wherein the first location is determined by first hardware processing circuitry, further comprising transferring the second location and the stored one or more acceleration measurements to second hardware processing circuitry.

14. The method of claim 9, wherein the message also includes the one or more acceleration measurements.

15. The method of claim 9, wherein the position acquisition device is implemented as part of glasses.

16. A non-transitory computer readable medium comprising instructions that when executed configure hardware processing circuitry to perform operations comprising:
configuring a position acquisition device into a low power state such that the position acquisition device is unable to obtain a location of a wearable electronic device;
receiving, while the position acquisition device is in the low power state, a command to capture an image with a camera;
in response to receiving the command, determining, while the position acquisition device is in the low power state, that a configurable setting indicates that a first location is to be captured and stored in association with the image;
storing one or more acceleration measurements from an accelerometer based on the configurable setting until at least the position acquisition device obtains a second location;
determining the first location based on the one or more acceleration measurements and the second location; and
transmitting a message over a network to a second device, the message indicating the second location.

17. The non-transitory computer readable medium of claim 16, wherein the operations further comprise:
activating the accelerometer based on the configurable setting; and
in response to the command to capture the image and in response to activating the accelerometer, storing the one or more acceleration measurements from the accelerometer.

18. The non-transitory computer readable medium of claim 17, wherein first hardware processing circuitry that determines the first location comprises a Bluetooth low energy network processor.

19. The non-transitory computer readable medium of claim 16, wherein the operations further comprise capturing the image in response to the command.

20. The non-transitory computer readable medium of claim 16, wherein the position acquisition device is implemented as part of glasses.

* * * * *